(12) United States Patent
Gudjohnsen et al.

(10) Patent No.: US 7,497,185 B2
(45) Date of Patent: Mar. 3, 2009

(54) AUDIBLE FILL LEVEL ALARMS FOR LIQUID STORAGE VESSELS

(75) Inventors: Einar P. Gudjohnsen, Bethany, CT (US); Peter J. Shukis, Bethany, CT (US)

(73) Assignee: Oil Equipment Manufacturing, LLC, Ansonia, CT (US)

( * ) Notice: Subject to any disclaimer, the term of this patent is extended or adjusted under 35 U.S.C. 154(b) by 20 days.

(21) Appl. No.: 11/552,594

(22) Filed: Oct. 25, 2006

(65) Prior Publication Data

US 2008/0098950 A1   May 1, 2008

(51) Int. Cl.
G01F 23/00 (2006.01)
(52) U.S. Cl. ..................... 116/109; 116/112
(58) Field of Classification Search ........... 116/109, 116/110, 112, 137 R, 142 FP, 227; 137/558; 446/216; 141/95

See application file for complete search history.

(56) References Cited

U.S. PATENT DOCUMENTS

| | | | | | |
|---|---|---|---|---|---|
| 1,408,022 | A * | 2/1922 | Nolen | .................. | 116/109 |
| 1,443,830 | A * | 1/1923 | Battin | .................. | 116/109 |
| 1,581,739 | A * | 4/1926 | Holler | .................. | 137/558 |
| 1,675,713 | A * | 7/1928 | Klein | .................. | 116/109 |
| 2,135,522 | A * | 11/1938 | Mathey | .................. | 137/558 |
| 2,143,476 | A * | 1/1939 | Crossley | .................. | 137/558 |
| 2,143,492 | A | 1/1939 | Morse | .................. | 137/558 |
| 2,227,323 | A * | 12/1940 | Mathey et al. | ............. | 137/558 |
| 2,233,229 | A * | 2/1941 | Tapp | .................. | 137/558 |
| 2,249,180 | A | 7/1941 | Scully et al. | ............. | 137/558 |
| 2,276,798 | A | 3/1942 | Scully et al. | ............. | 116/110 |
| 2,323,156 | A * | 6/1943 | Scully et al. | ............. | 116/109 |
| 2,328,686 | A * | 9/1943 | Scully et al. | ............. | 116/110 |
| 2,347,193 | A * | 4/1944 | Hammand | ............. | 116/109 |
| 2,360,338 | A * | 10/1944 | Hammand | ............. | 116/109 |
| 2,461,439 | A * | 2/1949 | Perkins | ............. | 119/14.15 |
| 2,519,324 | A * | 8/1950 | Smith, Jr. | ............. | 446/216 |
| 2,531,950 | A * | 11/1950 | Scully | .................. | 137/558 |
| 2,549,231 | A * | 4/1951 | Perkins | ............. | 119/14.08 |
| 2,720,216 | A * | 10/1955 | Scully | .................. | 137/558 |
| 2,751,877 | A * | 6/1956 | Boone et al. | ............. | 116/109 |
| 2,759,489 | A * | 8/1956 | Schutter | ............. | 137/558 |
| 2,867,942 | A * | 1/1959 | Wintriss | ............. | 446/216 |
| 2,910,956 | A * | 11/1959 | Scully | .................. | 116/109 |
| 2,959,889 | A * | 11/1960 | Gausewitz | ............. | 446/166 |
| 2,972,362 | A * | 2/1961 | Gardner | ............. | 141/96 |
| 3,129,528 | A * | 4/1964 | Gausewitz | ............. | 446/153 |
| 3,138,895 | A * | 6/1964 | Gausewitz | ............. | 446/205 |
| 3,924,559 | A * | 12/1975 | Renner et al. | ............. | 116/109 |
| 4,398,491 | A * | 8/1983 | Fridl et al. | ............. | 116/67 R |
| 4,856,564 | A | 8/1989 | Obal | .................. | 141/95 |
| 4,997,013 | A | 3/1991 | Peckels | ............. | 141/95 |
| 5,829,491 | A | 11/1998 | Bennett | ............. | 141/59 |
| 5,832,968 | A | 11/1998 | Leary | .................. | 141/94 |
| 5,975,154 | A | 11/1999 | Bennett | ............. | 141/59 |
| 6,000,359 | A | 12/1999 | Hudson, Jr. et al. | ......... | 116/109 |
| 6,672,244 | B1 | 1/2004 | Martin | ............. | 116/109 |
| 6,725,800 | B2 | 4/2004 | Hawkins | ............. | 116/109 |
| 6,837,177 | B2 * | 1/2005 | Tanaka | ............. | 116/137 R |

* cited by examiner

*Primary Examiner*—R. A. Smith
(74) *Attorney, Agent, or Firm*—Ohlandt, Greeley, Ruggiero & Perle, L.L.P.

(57) ABSTRACT

An audible fill level alarm is provided. The alarm includes a whistle body having a lower whistle hole, a whistle-tube depending from said whistle body, and a whistle disk having an upper whistle hole. The whistle disk and the whistle body define a whistle chamber that is conical in shape.

18 Claims, 7 Drawing Sheets

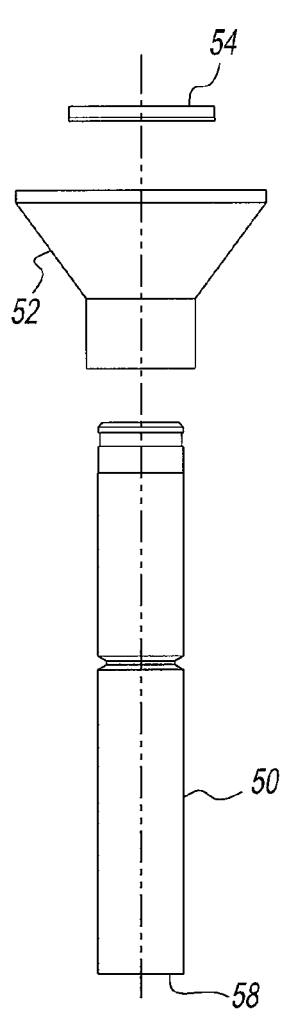
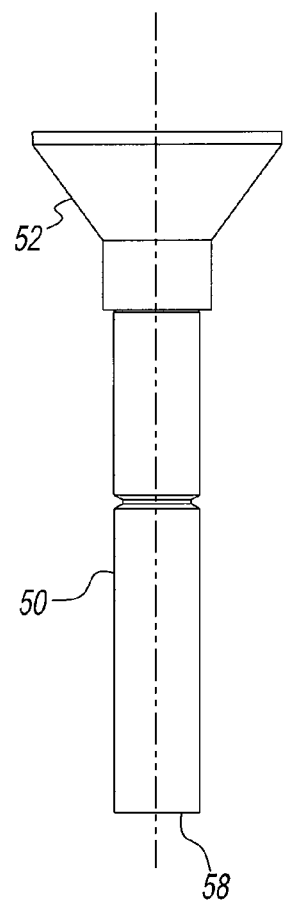
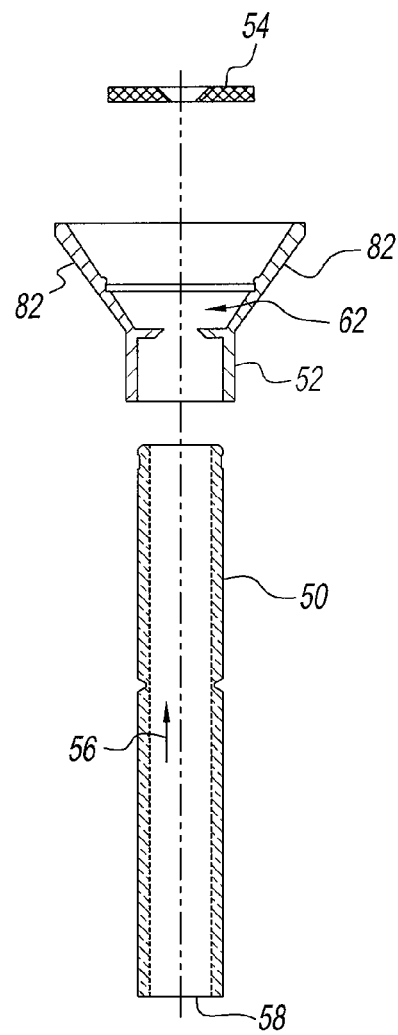
Fig. 14
Fig. 13
Fig. 15

AUDIBLE FILL LEVEL ALARMS FOR LIQUID STORAGE VESSELS

BACKGROUND OF THE INVENTION

1. Field of the Invention

The present disclosure is related to liquid storage vessels. More particularly, the present disclosure is related to audible fill level alarms for such liquid storage vessels.

2. Description of Related Art

Many different types of storage vessels are known for storing various liquids such as, but not limited to, liquid fuel oils, liquid foods or food components, liquid pharmaceuticals, and the like. During the filling of such vessels, it is often necessary to pump a liquid into the storage vessel from another vessel or supply source.

In order to prevent overflowing of the storage vessel, it is known to place an audible fill level alarm on the storage vessel to alert the person filing the storage vessel when the vessel has reached a desired fill level. Typically, the audible fill level alarm is located on the storage vessel itself.

In certain situations, the distance between the storage vessel having the audible alarm and the person filling the storage vessel is such that the audible alarm can not be heard due noise from construction, traffic, and the filling equipment itself, and other sources.

Accordingly, there is a continuing desire for audible fill alarms for storage vessels that overcome this and other deficiencies of the prior art.

BRIEF SUMMARY OF THE INVENTION

It is an object of the present disclosure to provide an audible alarm whistle.

These and other objects and advantages of the present disclosure are provided by an audible fill level alarm having a conical whistle chamber.

In some embodiments, an audible fill level alarm is provided that includes a whistle body having a lower whistle hole, a whistle-tube depending from said whistle body, and a whistle disk having an upper whistle hole. The whistle disk and the whistle body define a whistle chamber that is conical in shape.

In other embodiments, an audible fill level alarm is provided that includes a conical whistle body having a lower whistle hole, a whistle-tube depending from said whistle body, and a whistle disk having an upper whistle hole. The whistle disk is secured to the whistle body to define a conical whistle chamber therebetween.

The above-described and other features and advantages of the present disclosure will be appreciated and understood by those skilled in the art from the following detailed description, drawings, and appended claims.

BRIEF DESCRIPTION OF THE SEVERAL VIEWS OF THE DRAWINGS

FIG. 13 is a side view of an alternate embodiment of the audible fill level alarm of FIG. 2;

FIG. 14 is a side exploded view of the audible fill level alarm of FIG. 13; and

FIG. 15 is a sectional view of FIG. 14.

DETAILED DESCRIPTION OF THE INVENTION

Figure 1:
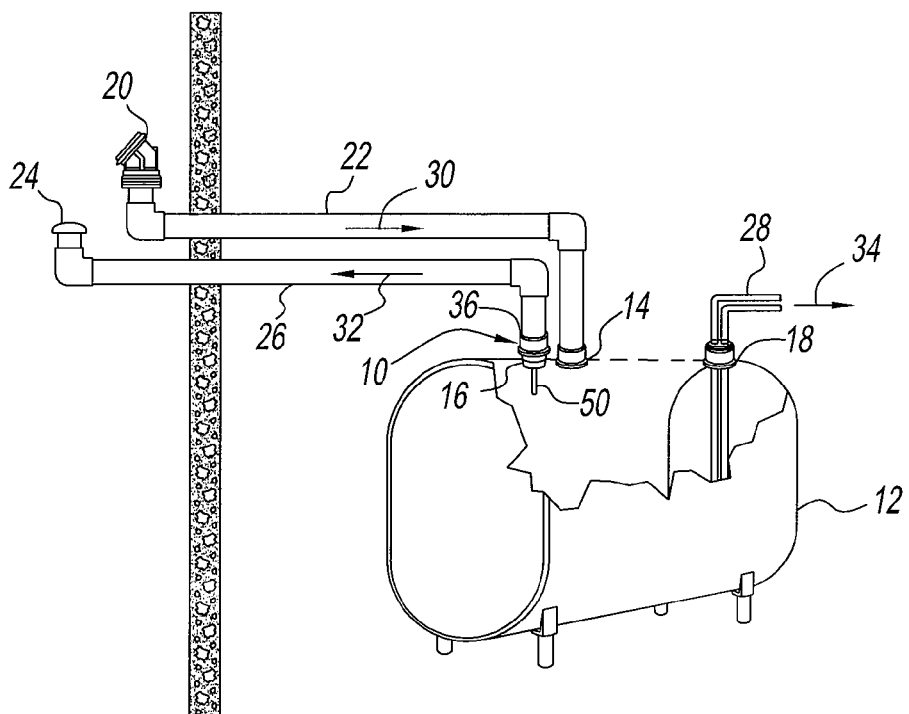
FIG. 1 illustrates an exemplary embodiment of an audible fill level alarm according to the present disclosure in use with a liquid storage vessel.

Referring to the drawings and in particular to FIG. 1, an audible fill level alarm according to the present disclosure, generally referred to by reference number 10, is shown. Advantageously, alarm 10 is a whistle that emits an audible alarm of a decibel level higher than previously possible.

Alarm 10 is shown in use with a liquid storage vessel 12. Vessel 12 can include any vessel suitable for holding a liquid. In the illustrated example, vessel 12 is shown as a fuel oil tank for storage of home heating oil. Of course, it should be recognized that alarm 10 finds use with other liquid storage vessels.

Vessel 12 includes an input-port 14, a vent port 16, and an output-port 18. Input-port 14 is in fluid communication with a fill-cap 20 via a first conduit 22. Vent port 16 is in fluid communication with a vent-cap 24 via a second conduit 26. Output-port 18 is in fluid communication via a third conduit 28 with, in the illustrated example, an oil burner (not shown) such as can be found on a home heating furnace (not shown) and/or a hot water heater (not shown).

Vessel 12 can be filled with a liquid through fill-cap 20, first conduit 22, and port 14 so that the liquid flows into the vessel in an inflow direction 30. When vessel 12 is filled with the liquid, air present in the vessel is forced from the vessel through vent-cap 24, second conduit 26, alarm 10, and vent-port 16 in a venting direction 32. The amount of air forced from vessel 12 is equal to the amount of air displaced by the liquid entering the vessel.

The liquid in the vessel 12 can be removed, via gravity and/or a pump (not shown), through output port 18 and third conduit 28 so that the liquid flows from the vessel in an outflow direction 34. During movement of the liquid from vessel 12, air is drawn into the vessel through vent-cap 24, second conduit 26, alarm 10, and vent-port 16 so that the air flows into the vessel in a direction opposite venting direction 32. The amount of air drawn into vessel 12 is equal to the volume displaced by the liquid leaving the vessel.

Alarm 10 can be placed anywhere within the vent path, namely in vent port 16, vent-cap 24, or second conduit 26, so that the alarm is in fluid communication with the vent path of vessel 12. In this manner, air forced from vessel 12 during the filling process can selectively exit through alarm 10. In the illustrated embodiment, alarm 10 is disposed in the vent air path at vent-port 16.

Figure 2:
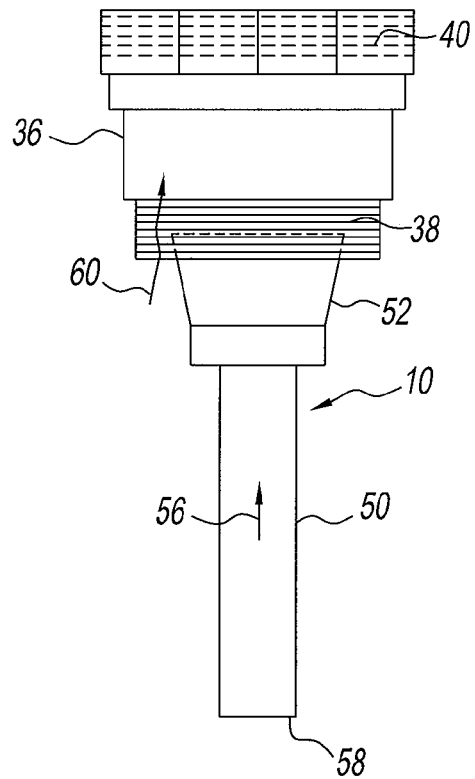
FIG. 2 is a side view of an exemplary embodiment of the audible fill level alarm according to the present disclosure in use with a fitting.

Preferably, alarm 10 is disposed in a fitting 36 engaged in vent port 16 of vessel 12. An exemplary embodiment of alarm 10 in use with fitting 36 is shown in FIG. 2. In the illustrated embodiment, fitting 36 is a double tapped housing that is threadably connected in vent port 16 and threadably connected to second conduit 26. Here, fitting 36 includes a male thread 38 for engagement with vent port 16 and a female thread 40 (illustrated in phantom) for engagement with second conduit 26.

Of course, it is contemplated by the present disclosure for fitting 36 to be configured for any connection method between vessel 12 and second conduit 26. For example, fitting 36 can be a threaded fitting, a compression fitting, a union connection fitting, a slip-in configuration such as those used with vessels having a double-wall configuration, and any combinations thereof.

Figure 4:
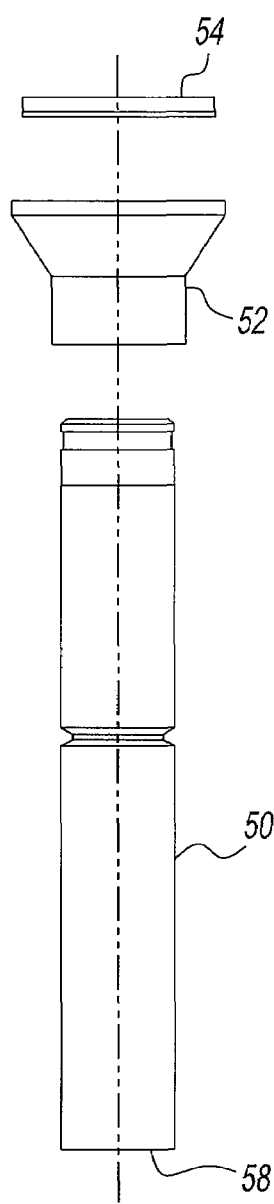
FIG. 4 is a side exploded view of the audible fill level alarm of FIG. 3.
Figure 5:
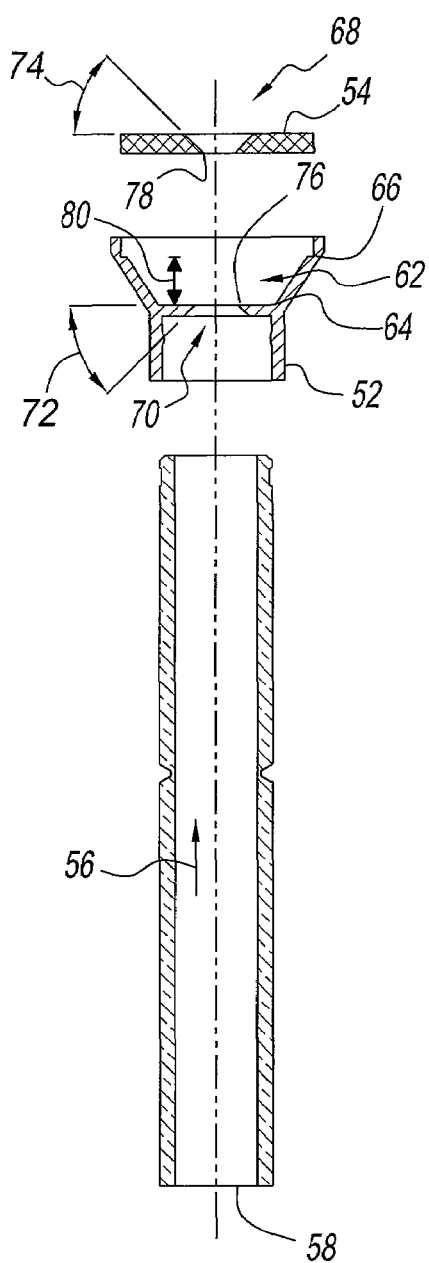
FIG. 5 is a sectional view of FIG. 4.

Alarm 10 includes a whistle-tube 50, a whistle body 52, and a whistle disk 54 (FIGS. 4 and 5). Alarm 10 is disposed in fitting 36 so that whistle-tube 50 extends into vessel 12 and at least a portion of whistle body 52 is within the fitting.

Air forced from vessel 12 during the filling process exits the vessel through a whistle vent path 56. Whistle vent path 56 is defined through whistle-tube 50, through whistle body 52, and through whistle disk 54, which causes the venting air to make an audible noise. When the fluid level inside of vessel 12 reaches a desired level, the fluid contacts a bottom 58 of fill tube 50. In this manner, whistle vent path 56 is blocked by the fluid. Since the venting air can no longer pass through whistle vent path 56, the audible noise of alarm 10 ceases when bottom 58 is blocked by the fluid. The cessation of the whistle of alarm 10 signals the operator that vessel 12 has been filled to the desired level.

Alarm 10 is movably positioned within fitting 36 such that an alternative vent path 60 can be selectively opened between whistle body 52 and an inner portion of fitting 36. Before use, alternative vent path 60 is maintained in a closed position by the force of gravity acting on alarm 10 to maintain whistle body 56 in a substantially closed position on fitting 36. During use, the operator fills vessel 12 at a desired flow rate, which can be sufficient, to overcome the force of gravity acting on alarm 10 to maintain whistle body 56 in the closed position on fitting 36. Thus, during filling at certain lower fill rates (e.g., 10 to 15 gallons per minute) alarm 10 may vent air only through whistle vent path 56. However, during filling at certain higher fill rates (e.g., 35 to 45 gallons per minute) alarm 10 may vent air through both whistle vent path 56 and alternative vent path 60. Once vessel 12 is filled to the point where the fluid level inside of vessel 12 contacts bottom 58 of fill tube 50, the venting air only passes through alternative vent path 60 so that the audible whistle from alarm 10 stops.

In use, an operator can fill vessel 12 through fill-cap 20 until the audible whistle from alarm 10 stops. Once the audible whistle from alarm 10 stops, the operator should stop the flow of liquid into vessel 12. Preferably, whistle-tube 50 extends a sufficient distance into vessel 12 to allow sufficient volume in the vessel to receive, after the audible whistle from alarm 10 stops, any remaining fluid in the operator's fill hose, fill-cap 20, and first conduit 22.

In home heating oil applications, it is common for vessel 12 to be filled a flow rate of between about 60 to about 100 gallons per minute, more typically about 80 gallons per minute. Since it is desired to mitigate the build up of pressure in vessel 12, the air venting from the vessel preferably has the substantially the same flow rate as the incoming fluid.

Figure 3:
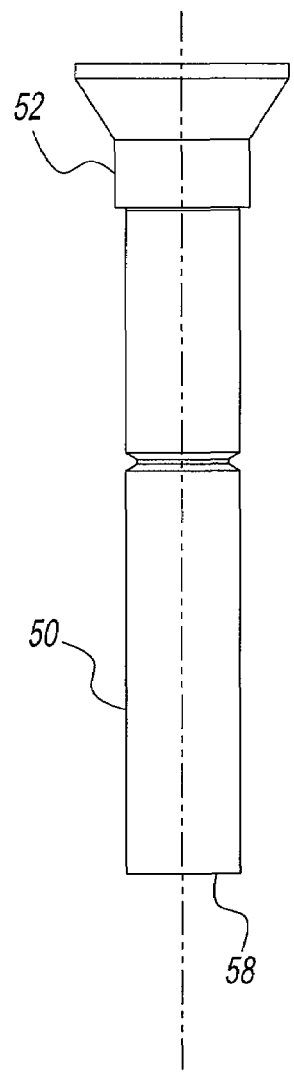
FIG. 3 is a side view of the audible fill level alarm of FIG. 2.

Advantageously, alarm 10 provides a louder alarm than has been previously possible. It has been determined by the present disclosure that certain physical dimensions and variables of alarm 10 are particularly important in the performance of the alarm. These physical dimensions and variables of alarm 10 are described with reference to FIGS. 3-5.

Alarm 10 is assembled by securing whistle disk 54 in whistle body 52 to define a whistle chamber 62 therebetween. Whistle disk 54 can be secured in whistle body 52 in any substantially airtight manner desired manner. In the illustrated embodiment, whistle disk 54 and body 52 are secured to one another via a snap fit connection for ease of assembly. Similarly, whistle body 52 can be secured to whistle-tube 50 in any substantially airtight manner desired manner. For example, whistle body 52 and whistle-tube 50 can be secured to one another via an adhesive, a threaded connection, a snap-fit connection, and others. In the illustrated embodiment, whistle body 52 and whistle-tube 50 are secured to one another via a press fit connection for ease of assembly.

Without wishing to be bound to any particularly theory, it has been determined by the present disclosure that the sound level of alarm 10 is, at least in part, effected by the volume of whistle chamber 62. More particularly it has been determined that the larger the volume of whistle chamber 62, the larger resulting sound provided by alarm 10.

Advantageously, alarm 10 achieves a desired volume whistle chamber 62 by providing the chamber with a generally conical shape. Conical whistle chamber 62 has its minor diameter 64 proximate whistle-tube 50 and its major diameter 66 proximate whistle disk 54. In this manner, conical whistle chamber 62 increases in diameter only in the direction of sound flow.

As another unexpected advantage provided by conical whistle chamber 62, the outer conical shape of the whistle chamber provides for a natural self-center of alarm 10 in fitting 36 and combines this natural self-centering feature with inner conical shape of the whistle chamber. In sum, whistle chamber 62 has an inner conical shape providing the desired audible alarm and an outer conical shape for self-centering of whistle body 52 in fitting 36.

Whistle chamber 62 has an upper hole 68 defined in whistle disk 54 and a lower hole 70 defined in whistle body 52. It has been determined by the present disclosure that the sound level of alarm 10 can also be increased by providing upper hole 68 with a first predetermined angle 72 and lower hole 70 with a second predetermined angle 74. First predetermined angle 72 is about 45 degrees so that a first sharp edge 76 is defined at the entrance to chamber 62. Similarly, second predetermined angle 74 is about 45 degrees so that a second sharp edge 78 is defined at the exit to chamber 62.

Figure 6:
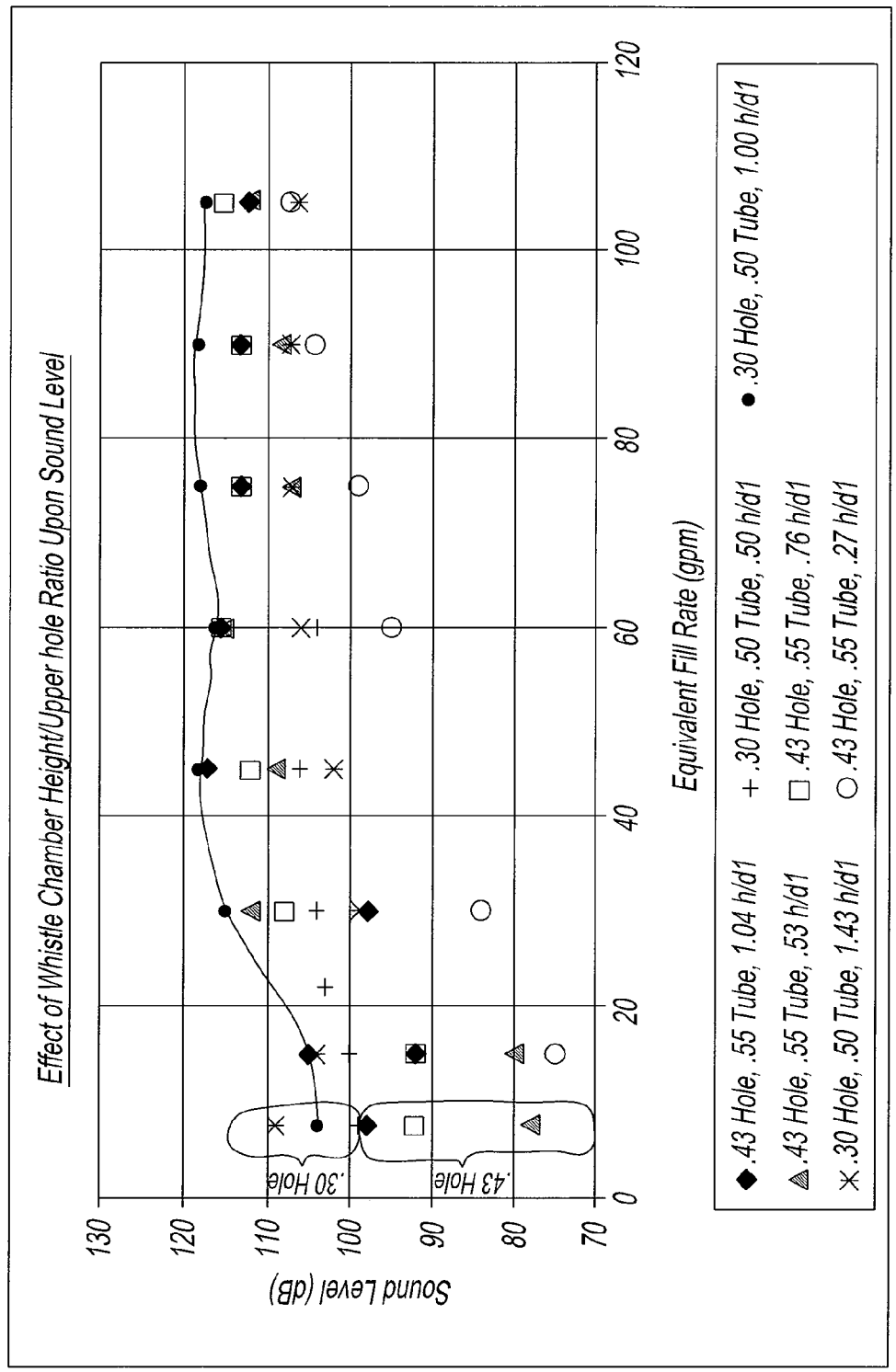
FIG. 6 is a graph illustrating the effect on the sound level at various fill rates due to a ratio of whistle chamber height to upper hole diameter.

Whistle chamber 62 has a height 80 defined by a bottom of whistle body 52 and a bottom of whistle disk 54. It has also been determined by the present disclosure that the sound level of alarm 10 can be increased by optimizing a ratio of height 80 to the diameter of upper hole 68. Referring now to FIG. 6, a graph illustrating the effect on the sound level of alarm 10 at various fill rates due to a ratio of whistle chamber height 80 to the diameter of upper hole 68 is provided. As can be seen, a ratio of about 1.0 of whistle chamber height 80 to the diameter of upper hole 68 provided alarm 10 with a highest sound level regardless of flow rate. Accordingly, alarm 10 of the present disclosure preferably has a ratio of about 1.0.

Figure 7:
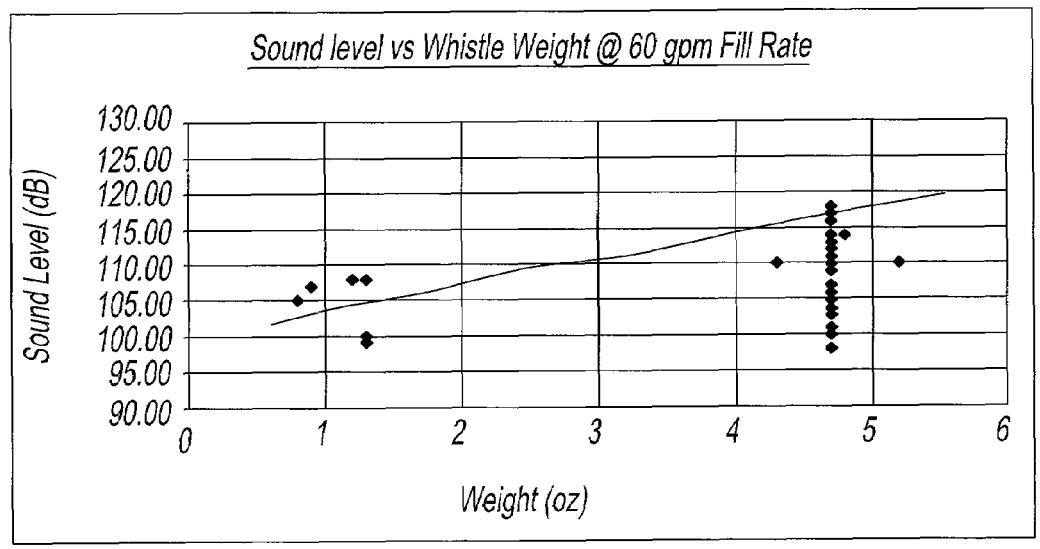
FIGS. 7 and 8 are graphs illustrating the effect on the sound level due to the weight of the audible fill level alarm whistle at first and second fill rates, respectively.
Figure 8:
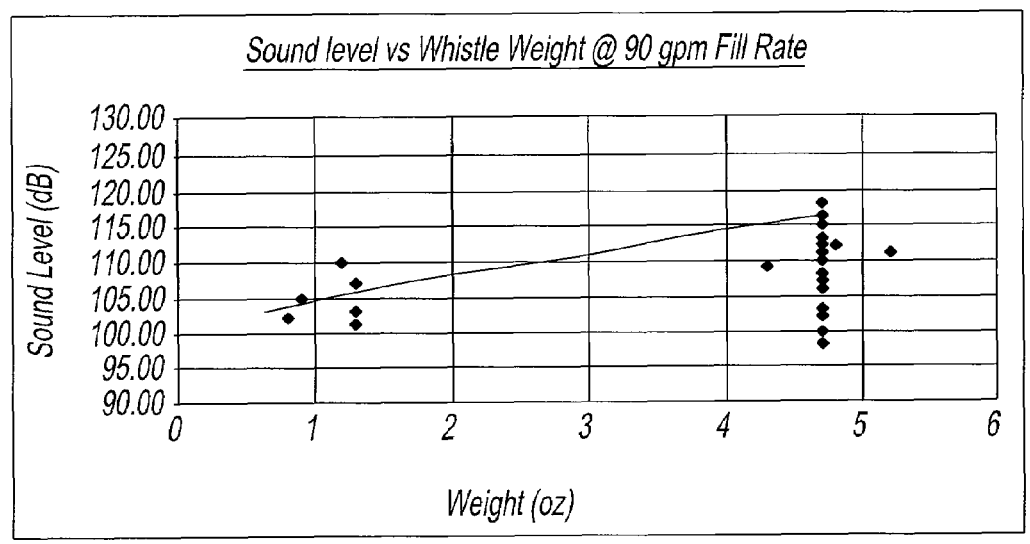

It has also been determined by the present disclosure that the sound level of alarm 10 is dependent on the weight of the alarm. FIGS. 7 and 8 are graphs illustrating the effect on the sound level due to the weight of alarm 10 at first and second fill rates, respectively. Without wishing to be bound to a particular theory, it is believed that the weight of alarm 10 effects the sound performance due to maximizing the use of vent path 56, while minimizing venting of air through alternate vent path 60 until necessary. Thus, alarm 10 has a weight sufficient maximize the amount of venting air passing through whistle vent path 56. As seen from FIGS. 7 and 8, alarm 10 preferably has a weight of between about 4 to about 5 ounces, preferably about 4.8 ounces, and any subranges therebetween. Further, it has been found that increasing the weight of alarm 10 above this predetermined level prevents the venting air from lifting the alarm from fitting 36, causing an undesired pressure build up in vessel 12. Accordingly, alarm 10 having the above desired weight ensures alternative vent path 60 is maintained in a closed position until the fluid reaches the desired level, but prevents a build-up of pressure in vessel 12 once the desired fill level is reached.

Figure 9:
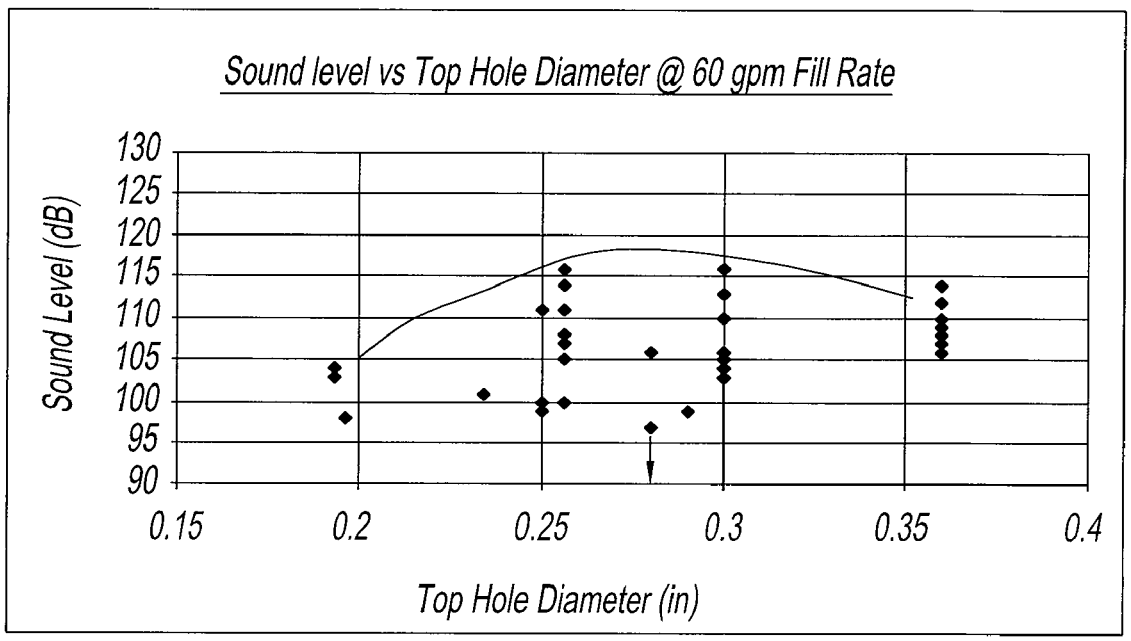
FIGS. 9 and 10 are graphs illustrating the effect on the sound level due to the diameter of the top whistle chamber hole at first and second fill rates, respectively.
Figure 10:
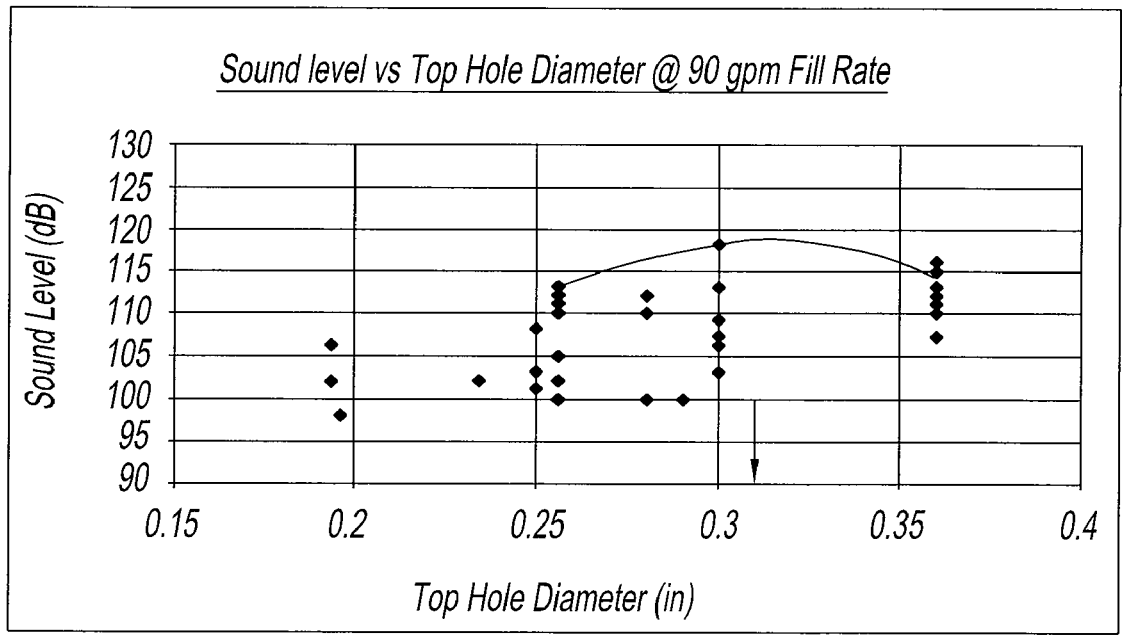

Referring now to FIGS. 9 and 10, the effect on the sound level of alarm 10 due to varying the diameter of upper hole 68 at first and second fill rates is shown. As can be seen, it has been determined that upper hole 68 having a diameter of between about 0.27 and about 0.32 inches is desired. In a preferred embodiment of the present disclosure, alarm 10 has upper hole 68 with a diameter of about 0.30 inches.

Figure 11:
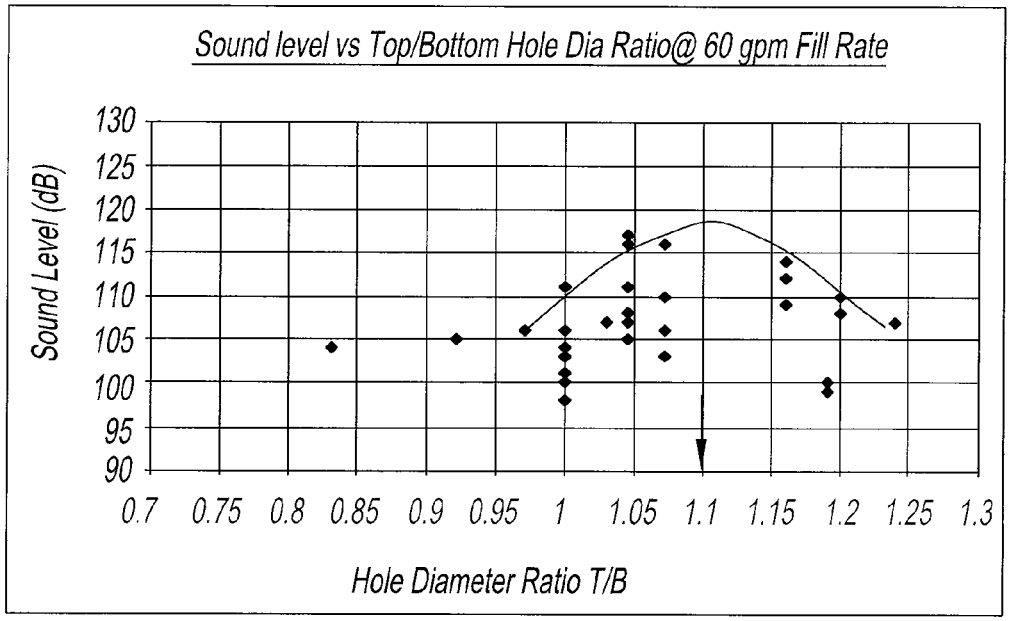
FIGS. 11 and 12 are graphs illustrating the effect on the sound level due to a ratio of the diameter of the top whistle chamber hole to the diameter of the bottom whistle chamber hole at first and second fill rates, respectively.
Figure 12:
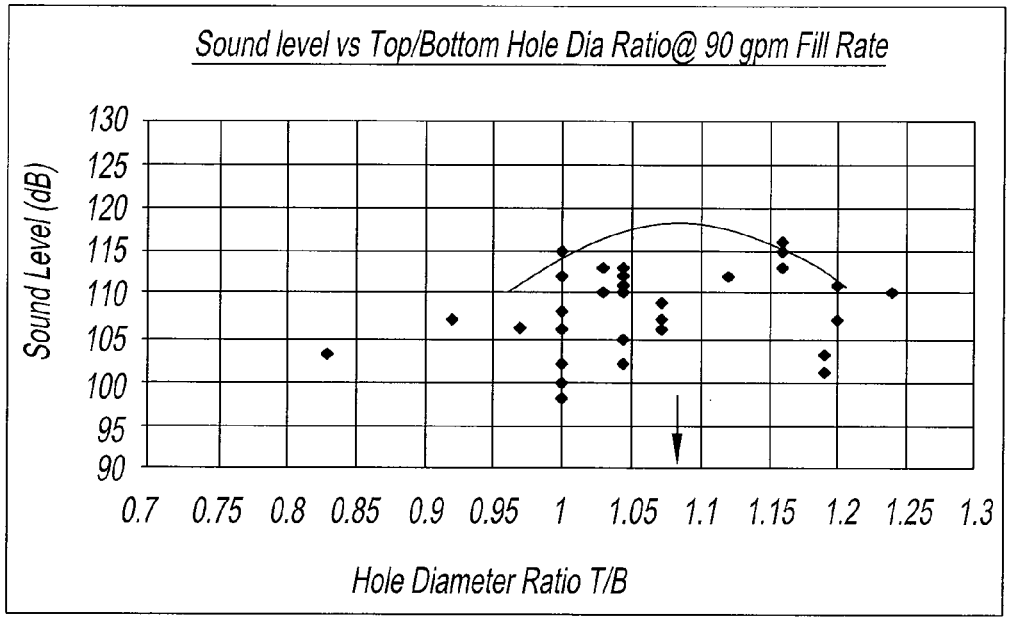

Referring now to FIGS. 11 and 12, the effect on the sound level of alarm 10 due to a ratio of the diameter of upper hole 68 to the diameter of lower hole 70 at first and fill rates is shown. As can be seen, it has been determined that a ratio of between about 1.075 to about 1.15 is preferred. In a preferred embodiment of the present disclosure, alarm 10 has a ratio of the diameter of upper hole 68 to the diameter of lower hole 70 of about 1.1.

Accordingly, in a preferred embodiment of alarm 10 includes an upper hole 68 with a diameter of about 0.300 inches, a lower hole 70 with a diameter of about 0.270 inches, and a height 80 of about 0.300 inches.

In the embodiment of alarm 10 shown in FIGS. 13-15, whistle body 52 includes an upper lip 82 that extends above whistle chamber 62. Upper lip 82 continues the generally conical shape of whistle body 52. Upper lip 82 can advantageously be used to secure alarm 10 in fitting 36 having a larger diameter than possible with alarm 10 omitting the upper lip. In addition, upper lip 82 increases in diameter in the direction of sound flow above chamber 62. Without wishing to be bound to any particular theory, it is believed that upper lip 82 also assists alarm 10 to function in a bullhorn-like fashion.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. An audible fill level alarm comprising:
   a whistle body having a lower whistle hole;
   a whistle-tube depending from said whistle body;
   a whistle disk having an upper whistle hole, said whistle disk and said whistle body defining a whistle chamber, said whistle chamber being conical in shape; and
   a ratio of a chamber height of said whistle chamber to a diameter of said upper whistle hole of about 1.0.

2. The audible fill level alarm as in claim 1, further comprising a ratio of a diameter of said upper whistle hole to a diameter of said lower whistle hole of between about 1.075 to about 1.15.

3. The audible fill level alarm as in claim 1, further comprising a ratio of a diameter of said upper whistle hole to a diameter of said lower whistle hole of about 1.1.

4. The audible fill level alarm as in claim 1, wherein said whistle body, said whistle-tube, and said whistle disk combine to provide a weight of about 4.8 ounces.

5. The audible fill level alarm as in claim 1, wherein said whistle body comprises an upper lip extending above said whistle chamber, said upper lip increasing in diameter in a direction of sound flow above said whistle chamber.

6. The audible fill level alarm as in claim 1, wherein said whistle body, said whistle-tube, and said whistle disk combine to provide a weight of between about 4 to about 5 ounces.

7. The audible fill level alarm as in claim 1, wherein said lower whistle hole comprises a first sharp edge proximate said whistle chamber and said upper whistle hole comprises a second sharp edge proximate said whistle chamber.

8. An audible fill level alarm comprising:
   a conical whistle body having a lower whistle hole;
   a whistle-tube depending from said whistle body;
   a whistle disk having an upper whistle hole, said whistle disk being secured to said whistle body to define a conical whistle chamber therebetween; and
   a ratio of a chamber height of said whistle chamber to a diameter of said upper whistle hole of about 1.0.

9. The audible fill level alarm as in claim 8, further comprising a ratio of a diameter of said upper whistle hole to a diameter of said lower whistle hole of between about 1.075 to about 1.15.

10. The audible fill level alarm as in claim 8, further comprising a ratio of a diameter of said upper whistle hole to a diameter of said lower whistle hole of about 1.1.

11. The audible fill level alarm as in claim 8, wherein said whistle body comprises an upper lip extending above said whistle chamber.

12. The audible fill level alarm as in claim 8, wherein said upper whistle hole has a diameter of about 0.300 inches, said lower whistle hole has a diameter of about 0.270 inches, and said conical whistle chamber has a height of about 0.300 inches.

13. The audible fill level alarm as in claim 8, wherein said lower whistle hole comprises a first sharp edge proximate said conical whistle chamber and said upper whistle hole comprises a second sharp edge proximate said conical whistle chamber.

14. The audible fill level alarm as in claim 8, further comprising a fitting, said conical whistle body being at least partially disposed in said fitting for movement between a venting position where said conical whistle body is against a portion of said fitting and an auxiliary vent position where an alternative vent path is opened between said whistle body and said portion of said fitting.

15. An audible fill level alarm comprising:
a whistle body having a lower whistle hole;
a whistle-tube depending from said whistle body;
a whistle disk having an upper whistle hole, said whistle disk and said whistle body defining a whistle chamber having a chamber height;
a ratio of a diameter of said upper whistle hole to a diameter of said lower whistle hole being between about 1.075 to about 1.15; and
a ratio of said chamber height to said diameter of said upper whistle hole being about 1.0.

16. The audible fill level alarm as in claim 15, wherein said whistle chamber is conical.

17. The audible fill level alarm as in claim 15, wherein said ratio of said diameter of said upper whistle hole to said diameter of said lower whistle hole is about 1.1.

18. The audible fill level alarm as in claim 15, wherein said whistle body comprises an upper lip extending above said whistle chamber, said upper lip increasing in diameter in a direction of sound flow above said whistle chamber.

* * * * *